Dec. 12, 1967     S. C. POLLOCK     3,357,338
CLOSED CAR VENTILATION
Filed Dec. 27, 1965
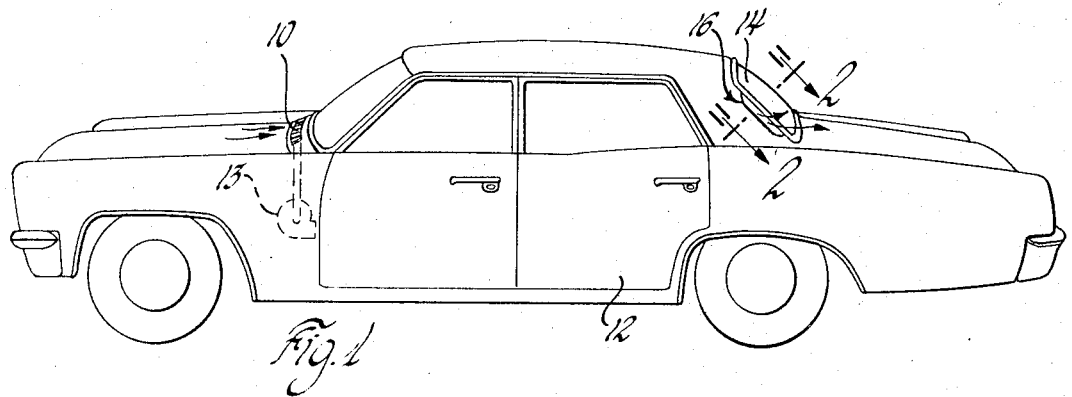
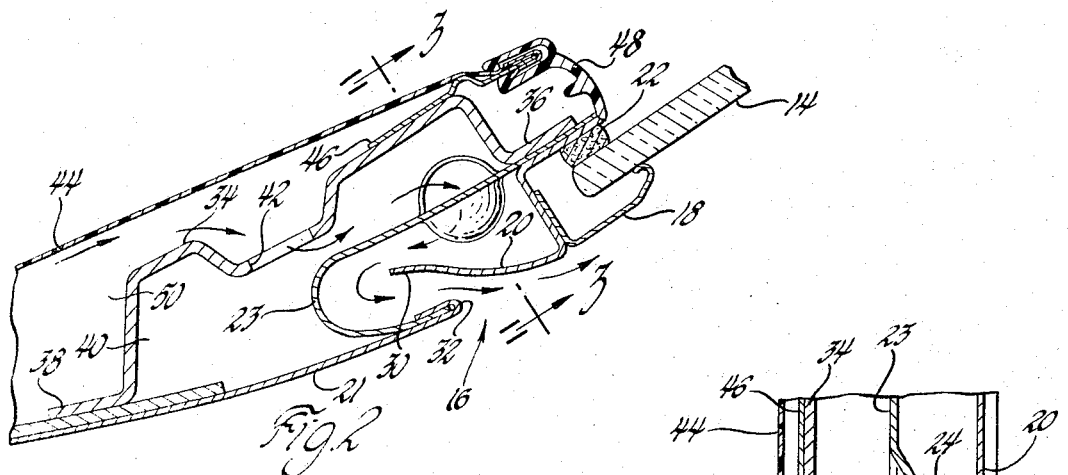
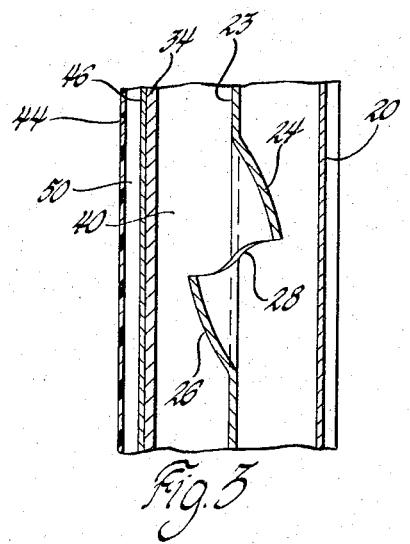
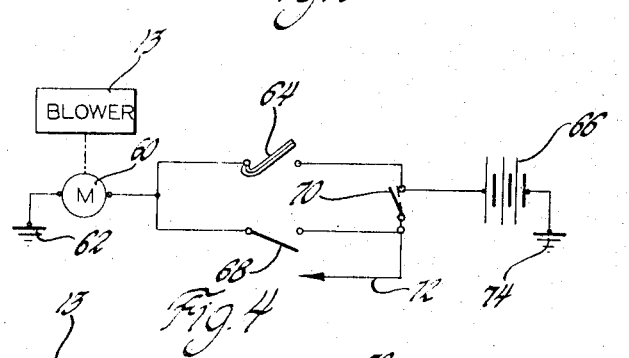
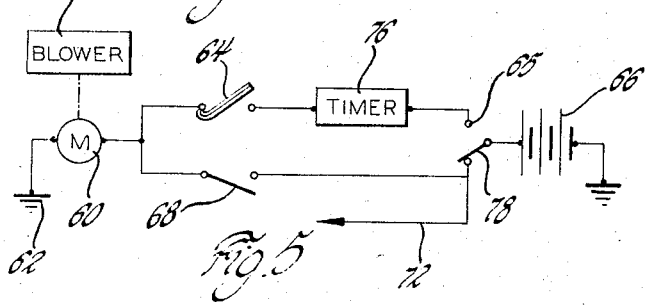
INVENTOR.
Samuel C. Pollock
BY
George C. Johnson
ATTORNEY

United States Patent Office 3,357,338
Patented Dec. 12, 1967

3,357,338
CLOSED CAR VENTILATION
Samuel C. Pollock, Rochester, Mich., assignor to General Motors Corporation, Detroit, Mich., a corporation of Delaware
Filed Dec. 27, 1965, Ser. No. 516,623
4 Claims. (Cl. 98—2)

ABSTRACT OF THE DISCLOSURE

A ventilation system in a closed car having an exhaust vent protected against the weather and a blower arrangement automatically effective to force ambient air thru the car interior and the exhaust vent when a predetermined temperature exists and the car is not operating.

State of the prior art

The United States patent to Gaskill et al., 3,118,603, discloses a blower motor for a car heating system and which motor is controlled in accordance with engine coolant heat available.

The United States patent to Watt, 3,143,951, shows an air vent for discharging blower propelled air or ram effect forced inlet air from the rear portion of a car passenger compartment.

Description of the invention

In the drawings:
FIGURE 1 is a perspective view of a car in which the present invention is utilized;
FIGURE 2 is an enlarged sectional view looking in the direction of the arrows 2—2 in FIGURE 1;
FIGURE 3 is a sectional view looking in the direction of the arrows 3—3 in FIGURE 2;
FIGURE 4 is a diagrammatic view of the blower circuit employed; and
FIGURE 5 is a modified version of the blower circuit.

A blower is utilized for forcing air from an inlet grill such as at 10 into a closed car 12 which has no controlled ventilation windows in the front doors, such windows being customary in most cars. Ventilation of the car, while closed from the elements, is provided by a discharge vent or vents preferably but not necessarily located at the rear of the passenger compartment and a conventional blower 13 and suitable ducts in the vicinity of the fire wall. Details of the inlet duct work are not disclosed herein as they form no part of the present invention.

At one side, and preferably at both sides, of the rear window 14 is a protected vent such as the left side vent generally indicated at 16. An outside moulding 18 cooperates with a roughly S-shaped section piece 20 to retain a sealant 22 and one margin of a rear window 14. The piece 20 cooperates with a lip of outside body metal 21 to support a vertical trough member 23 and the latter is formed with oppositely disposed and downwardly inclined ears 24 and 26 defining an outwardly and downwardly inclined air discharge port 28 (FIGURE 3). The piece 20 has a forwardly extending lip 30 (FIGURE 2) which enters the U-shaped trough of the member 23 and aids in defining a final air discharge slot 32 leading to the atmosphere. A body reinforcing member 34 having a generally U-shaped section is provided with opposed flanges 36 and 38 and cooperates with the trough member 23 in defining a chamber 40 which is closed except for an opening 42 and the inclined port 28.

An interior body lining 44 is held in tension by a clamp element 46 welded to the member 34 and an interior window moulding 48 which abuts a rear edge of the trough member 23. A zone 50 between the lining 44 and the member 34 is connected to the passenger compartment by a duct (not shown) and is open to the opening 42. The FIGURE 2 type of air outlet is preferred but it is obvious that the present invention contemplates no special form of outlet and that the term "closed car" includes a vehicle such as a coupe or sedan with an open window, some sort of vent or mere leakage serving as a suitable outlet.

In FIGURE 4, a blower motor 60 is grounded at 62 and may be connected through a thermostatic switch 64 to a battery 66 or through a blower motor switch 68 and a single pole ignition switch 70 to the battery. A line 72 connects the switch 70 to the ignition of the car engine and the battery is grounded at 74.

FIGURE 5 depicts a circuit similar to that of FIGURE 4 but in this case a timer 76 is connected in series with one pole of a two-pole ignition switch 78 and then to the battery 66. The timer is such that it will open the circuit including the closed switch 64 and the switch 78 a preselected time after the circuit through the timer is established.

It will be appreciated that the blower 13 and its motor 60 will be positioned in the car 12 to force air entering at 10 into the passenger compartment. This air will then traverse the compartment and be discharged by way of the zone 50, the opening 42, the inclined port 28 and the slot 32. This discharge is preferably from both sides of the car as heretofore stated although the description specifically refers to only one side. The slot 32 is located at a low pressure area of the wind stream around the car so that an inductive effect is realized to aid the blower 13.

If the circuit of FIGURE 4 is used, and the car 12 is left in a hot sun while closed, the ignition switch 70 will be open and heat would accumulate in the car to an undesirable degree if the present invention were not employed. The switch 64 of the present invention, however, may be set to close at or above say 90° F., and the blower motor 60 will operate to ventilate the car, i.e., force air from the inlet grill 10 to the outlet slot 32. Blower operation will cease when the car temperature drops below 90° F. automatically to open the switch. When the car is operating the switch 64 will be of no effect unless the switch 68 happens to be open.

When the circuit of FIGURE 5 is used, and assuming the car is not being operated, the switch 78 will be open insofar as the ignition is concerned. Being a two-pole switch, it will be closed insofar as the timer 76 and switch 64 are concerned. If the unoperated car interior becomes unduly heated, the switch 64 will close with the contact 65 and operate the blower motor 60 for an interval determined by the setting of the timer 76 and limited in order to protect the battery 66.

I claim:
1. A ventilation system in a closed car having a passenger compartment, an air inlet and an air outlet serving said compartment, an engine ignition switch, a source of power, a blower, a motor connected through one pole of said ignition switch to said power source and arranged to drive said blower to force air from said inlet to said outlet while said car is not being operated, and a thermostatic switch connected between said ignition switch and said motor and subject to the temperature of said compartment to control said motor.

2. A ventilation system as set forth in claim 1, said source of power being permanently connected thru said one pole of said thermostatic switch to said motor independently of either closed or open condition of said ignition switch.

3. A ventilation system as set forth in claim 1, said air inlet and said air outlet being at opposite ends of said compartment and therefore adapted thoroughly to ventilate the latter, said source of power being in the form of a battery, and said thermostatic switch being effective to bypass said engine ignition switch when the engine of said closed car is not being operated.

4. A ventilation system in a closed car having a passenger compartment, an air inlet and an air outlet serving said compartment, an ignition switch for the engine of said car, a battery, a blower arranged to force air through said compartment by way of said inlet, a motor connected in a circuit leading through one pole of said ignition switch to said battery and arranged to drive said blower, a thermostatic switch and a timer connected in series in said circuit, said timer being operative to determine the interval of operation of said blower when said thermostatic switch is closed, and said thermostatic switch being subject to the temperature of said compartment.

References Cited

UNITED STATES PATENTS

| | | | |
|---|---|---|---|
| 1,941,363 | 12/1933 | Norviel | 98—2 |
| 2,291,543 | 7/1942 | Findley | 98—2 |
| 2,300,418 | 11/1942 | Hall. | |
| 2,308,887 | 1/1943 | McCollum | 98—2 |

MEYER PERLIN, *Primary Examiner.*